US006834505B2

(12) United States Patent
Al-Roub et al.

(10) Patent No.: US 6,834,505 B2
(45) Date of Patent: Dec. 28, 2004

(54) HYBRID SWIRLER

(75) Inventors: Marwan Al-Roub, Dayton, OH (US); Stanford P. Seto, Loveland, OH (US); John Robert Staker, Cincinnati, OH (US); Ting-Yu Tu, West Chester, OH (US)

(73) Assignee: General Electric Company, Schenectady, NY (US)

( * ) Notice: Subject to any disclaimer, the term of this patent is extended or adjusted under 35 U.S.C. 154(b) by 103 days.

(21) Appl. No.: 10/265,824

(22) Filed: Oct. 7, 2002

(65) Prior Publication Data

US 2004/0065090 A1 Apr. 8, 2004

(51) Int. Cl.[7] ............................. F23R 3/04
(52) U.S. Cl. .......................... 60/737; 60/748
(58) Field of Search .................... 60/737, 738, 748

(56) References Cited

U.S. PATENT DOCUMENTS

| | | | |
|---|---|---|---|
| 3,853,273 A | * 12/1974 | Bahr et al. ................. | 60/748 |
| 4,194,358 A | 3/1980 | Stenger | |
| 4,198,815 A | * 4/1980 | Bobo et al. ................. | 60/737 |
| 4,763,482 A | 8/1988 | Wehner | |
| 5,197,289 A | 3/1993 | Glevicky et al. | |
| 6,279,323 B1 | * 8/2001 | Monty et al. ................. | 60/748 |
| 6,453,671 B1 | * 9/2002 | Leen et al. ................. | 60/748 |
| 6,571,559 B1 | * 6/2003 | Fortuna et al. ............... | 60/748 |

FOREIGN PATENT DOCUMENTS

GB 2085147 * 4/1982

OTHER PUBLICATIONS

Burrus et al, "Energy Efficient Engine, Combustion System Component Technology Development Report," R82AEB401, Nov. 1982, pp. i–iii, 1–11, 37–45, and 103–107.

* cited by examiner

Primary Examiner—Michael Koczo
(74) Attorney, Agent, or Firm—William S. Andes; Francis L. Conte

(57) ABSTRACT

A swirler includes a tubular body having a row of secondary radial swirl vanes. A tubular ferrule adjoins the body at the secondary vanes, and includes a row of primary swirl vanes. The primary vanes are disposed axially obliquely to the secondary vanes, with a common annular inlet facing radially outwardly for swirling air radially inwardly therefrom with axial momentum into the tubular body.

20 Claims, 3 Drawing Sheets

HYBRID SWIRLER

BACKGROUND OF THE INVENTION

The present invention relates generally to gas turbine engines, and, more specifically, to combustors therein.

In a gas turbine engine, air is pressurized in a compressor and mixed with fuel in a combustor for generating hot combustion gases that flow downstream through turbine stages which extract energy therefrom. A high pressure turbine powers the compressor, and a low pressure turbine produces useful work by powering an upstream fan in a typical turbofan gas turbine engine aircraft engine application, for example.

Combustor performance is critical to the overall performance of the gas turbine engine. The compressed air is mixed with fuel in the combustor for generating a fuel and air mixture which is ignited for generating the combustion gases.

For a typical annular combustor, a row of carburetors in the form of discrete swirlers and cooperating fuel injectors are used to mix the fuel and air prior to combustion, with the combustion gases being circulated downstream through the combustor for discharge to the turbines.

Combustor performance is in most part controlled by performance of the carburetors and involves many competing design objectives. Combustion must be suitably complete for reducing exhaust emissions, yet cannot be excessively lean to the point of flameout. The combustion gases require stable recirculation within the combustor without suckback or flashback into the individual swirlers.

Since the fuel and air are channeled into the combustor at circumferentially spaced apart discrete locations, variations in the fuel and air mixtures and resulting combustion gases occur both circumferentially as well as radially between the outer and inner combustor liners. Such variation must be minimized for improving performance and stability of the combustor.

And, the swirler itself requires precision in design and operation for mixing the compressed air with the injected fuel in a manner consistent with desired combustor performance.

Three basic types of air swirlers are known. In one design, a row of inclined primary apertures discharge jets of primary swirl air followed in turn by a row of secondary radial swirl vanes, i.e., jet-rad design. Fuel is injected at the center of the primary air jets, with the primary jets firstly swirling compressed air around the fuel, with the secondary radial vanes swirling additional air typically in counter rotation with the primary swirl air.

In a second known design, a row of primary radial swirl vanes replace the primary jets and operate in conjunction with the secondary radial swirl vanes, i.e., rad-rad design, for typically swirling the air in counter rotation around the injected fuel.

Another type of swirler design found in a double annular combustor includes primary axial swirl vanes cooperating with secondary radial swirl vanes, i.e., ax-rad design. In this design, the primary vanes directly receive the pressurized air under dynamic pressure thereof with axial momentum through the swirler. However, variations in the dynamic pressure of the compressed air around the circumference of each swirler and around the circumference of the double annular combustor causes variations in performance of the individual swirlers and in the resulting combustor performance.

The jet-rad design can cause uncontrolled fuel auto-ignition in high pressure ratio engines, and is therefore not preferred. However, the primary jets of swirl air promote stable recirculation zones of the combustion gases inside the combustor dome, and require minimum use of purge air through the fuel injectors.

The rad-rad design is considered superior in performance because it eliminates the cause of auto-ignition by eliminating zones of separated airflow caused by the discrete primary jets in the jet-rad design. However, the rad-rad design requires a large amount of purge air from the fuel injectors to produce axial momentum in the fuel and air mixture for establishing the desirable recirculation zone within the combustor dome.

Since the recirculation zone in the combustor is a key contributor to overall combustor performance, the particular design of the swirler affects combustor performance, requires compromise, and has associated advantages and disadvantages.

Accordingly, it is desired to provide an improved swirler for a gas turbine engine combustor for enhancing combustor performance while reducing purge air requirements, and also reducing manufacturing complexity and swirler cost.

BRIEF DESCRIPTION OF THE INVENTION

A swirler includes a tubular body having a row of secondary radial swirl vanes. A tubular ferrule adjoins the body at the secondary vanes, and includes a row of primary swirl vanes. The primary vanes are disposed axially obliquely to the secondary vanes, with a common annular inlet facing radially outwardly for swirling air radially inwardly therefrom with axial momentum into the tubular body.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
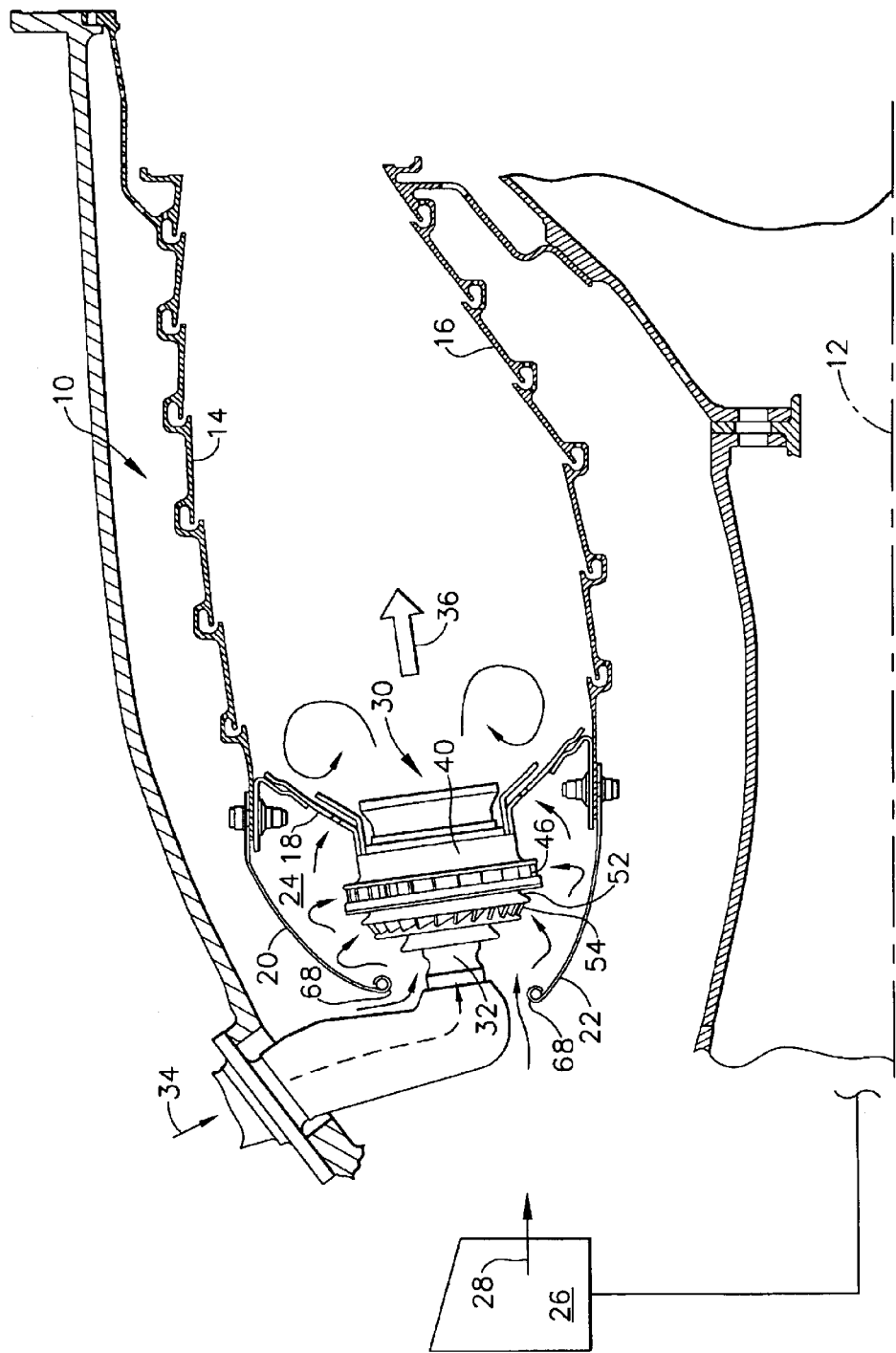
FIG. 1 is an axial, partly sectional view of a portion of an exemplary annular combustor of a turbofan gas turbine engine including a row of hybrid swirlers in accordance with an preferred embodiment of the present invention which receive pressurized air from an upstream compressor.

Illustrated in FIG. 1 is a portion of an exemplary turbofan gas turbine engine including an annular combustor 10 suitably mounted inside a casing coaxially about a longitudinal or axial centerline axis 12. The combustor includes radially outer and inner annular combustor liners 14, 16 which are suitably joined at upstream ends thereof to an annular combustor dome 18.

The exemplary combustor is a singular annular combustor design and includes radially outer and inner cowls 20, 22 extending axially forwardly from the dome at the juncture with the outer and inner liners to define an annular plenum 24 on the upstream side of the dome.

The engine includes a suitable compressor 26, such as a conventional multistage axial compressor, suitably configured for pressurizing air 28 as it flows downstream therethrough. The pressurized air 28 is channeled axially downstream from the compressor through a suitable diffuser at the aft end thereof and enters the plenum 24 through the annular inlet defined between the two cowls. The combustor as described above and the compressor may have any conventional configuration.

In accordance with the present invention, the combustor 10 illustrated in FIG. 1 includes a row of circumferentially spaced apart hybrid swirlers 30 suitably mounted through corresponding apertures in the combustor dome 18. Each swirler cooperates with a corresponding fuel injector nozzle 32 to define a carburetor. Each nozzle 32 injects fuel 34 into the swirler wherein it is mixed with pressurized air 28 for generating a fuel and air mixture which is suitably ignited for generating hot combustion gases 36 that collectively flow downstream between the combustor liners.

The combustion gases are discharged from the outlet end of the combustor into a high pressure turbine (not shown) which extracts energy therefrom for powering the compressor. A low pressure turbine (not shown) is disposed downstream of the high pressure turbine and is suitably configured for producing output power, such as for powering an upstream fan in a typical turbofan gas turbine engine aircraft application.

Figure 2:
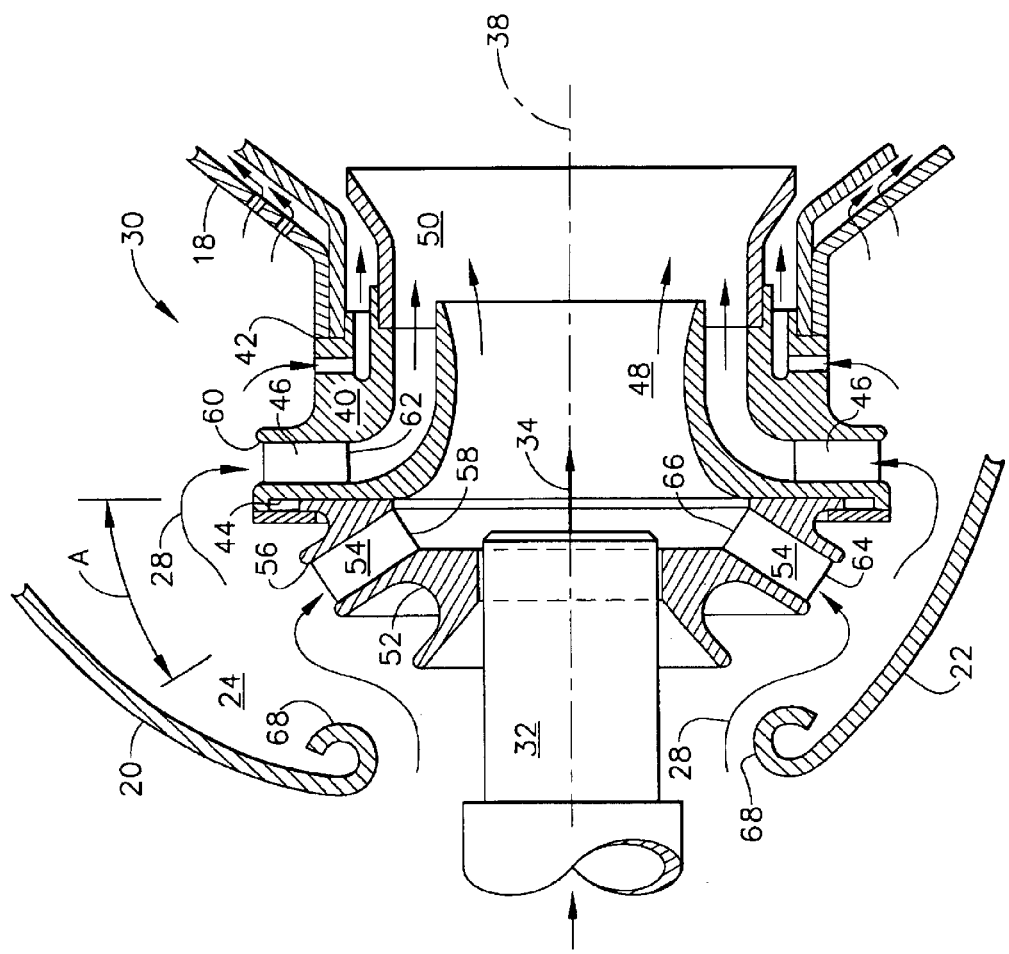
FIG. 2 is an enlarged, axial sectional view through one of the swirlers illustrated in FIG. 1 including a fuel injector nozzle mounted therein for injecting fuel for mixing with air from primary and secondary swirl vanes disposed in accordance with a preferred embodiment.

An exemplary one of the hybrid swirlers 30 is illustrated in more detail in FIG. 2, and is axisymmetrical about its own axial centerline axis 38. Each swirler includes a tubular body 40 having an aft end 42 suitably fixedly joined to the combustor dome 18, and an axially forward face 44 at the opposite end thereof. The body further includes a row of secondary radial swirl vanes 46 extending radially inwardly for swirling a corresponding portion of the pressurized air 28 radially inwardly therefrom.

The body 40 typically also includes a tubular venturi 48 extending aft from its juncture with the upstream side of the secondary vanes 46, with a venturi outlet near the outlet of the body itself. The body typically also includes an annular baffle 50 extending from its aft end and into the combustor dome for providing a barrier for the combustion gas flamefront. Surrounding the baffle is a typical splashplate cooperating therewith, both of which are suitably cooled by portions of the pressurized air channeled over the upstream surfaces thereof.

Figure 3:
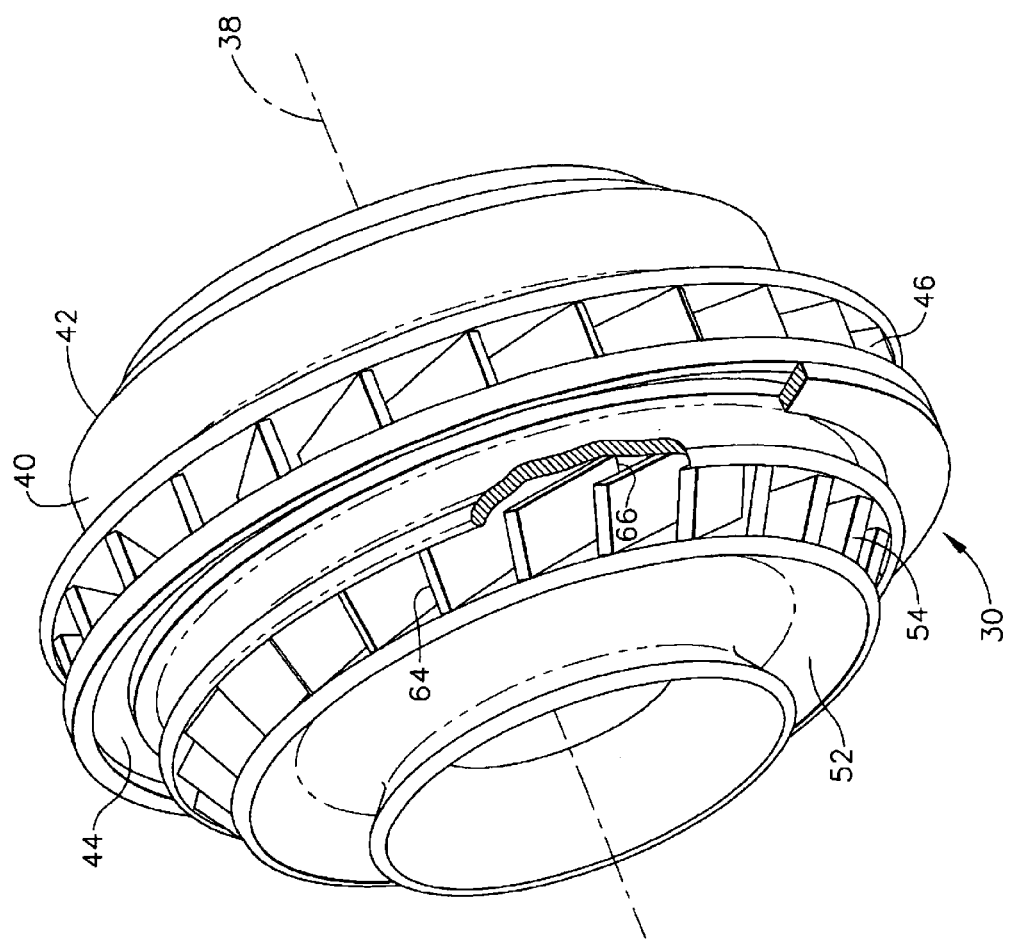
FIG. 3 is an isometric view of the exemplary swirler of FIG. 2 illustrated in isolation with a portion thereof being removed for illustrating the exemplary form of the primary swirl vanes.

The tubular body 40 including the secondary vanes and venturi may have any conventional configuration and is typically formed as a unitary casting. The secondary vanes are inclined radially or circumferentially inwardly relative to the centerline axis 38 of the swirler, as shown in FIG. 3, for imparting swirl to the air channeled therebetween.

Each swirler also includes a tubular ferrule 52 having a central bore in which the fuel injection nozzle 32 is loosely disposed. The flat aft face of the ferrule extends radially in a slip fit adjoining the flat forward face 44 of the body and is suitably retained thereto by an annular retainer in a conventional manner. In this way, the ferrule may slide radially inwardly and outwardly relative to the centerline axis of the engine under the effects of differential thermal expansion and contraction between the fuel injector nozzle supported by the casing, and the combustor which supports the swirlers.

In the preferred embodiment illustrated in FIG. 2, the ferrule 52 adjoins the body at the secondary vanes 46, and includes a corresponding row of primary swirl vanes 54 disposed axially obliquely at an acute inclination angle A relative to the axial-plane junction between the ferrule and tubular body to define a hybrid swirler having improved configuration and performance in accordance with the present invention.

The primary vanes 54 illustrated in FIG. 2 have a common annular inlet 56 defined by the outer perimeter of the ferrule between corresponding side plates between which the individual primary vanes are mounted, preferably in a common or unitary casting. The primary inlet 56 faces in most part radially outwardly relative to the centerline axis of the swirler for swirling a corresponding portion of the pressurized air 28 radially inwardly therefrom with axial, as well as angular, momentum as the air is swirled into the tubular body.

The hybrid swirler 30 illustrated in FIG. 2 is unlike the jet-rad, rad-rad, and ax-rad designs disclosed above, but is hybrid thereof in a new combination of features enjoying improved performance without expressed disadvantages thereof. The secondary vanes 46 may be conventionally configured as in the previous designs. However, the hybrid primary swirl vanes 54 are configured neither as a conventional radial primary swirl vanes, nor as the conventional primary jet apertures, nor as the primary axial vanes.

In contrast, the primary vanes 54 are axially inclined obliquely relative to the radial secondary vanes and are characterized as a form of radial swirl vane with radial or circumferential inclination, with the addition of axial inclination for effecting an axial component of airflow therethrough. Yet, the primary vanes are not configured as conventional axial swirl vanes which lack radial swirl capability.

Significant advantages of the hybrid swirler include the use of the primary vanes for producing angular momentum in the primary airflow to stabilize flow from the swirler, and eliminate flow separation. The primary vanes are also configured for eliminating the auto-ignition due to fuel trapping in the wakes of the jets in the jet-rad design.

The introduction of the axial component of airflow between the primary vanes creates preferential axial momentum in the primary swirl air for stabilizing the recirculation zones within the combustor dome, and eliminates or reduces the need for purge air from the fuel injector nozzles. Elimination or reduction of purge air requirements improves aerodynamic performance of the swirler, and also reduces complexity of manufacture and cost of the swirler.

The primary swirl vanes 54 illustrated in FIG. 2 also include a common annular primary outlet 58 facing radially inwardly, and disposed axially aft or downstream preferably in most part from the axially forward or upstream primary inlet 56. In this way, the primary vanes are effective as radial swirl vanes for swirling the pressurized air radially inwardly into the tubular body, yet with the addition of a suitable component of axial momentum not found in conventional radial vanes.

The secondary swirl vanes 46 similarly have a common annular secondary inlet 60 around the perimeter thereof, and a common annular secondary outlet 62 radially inwardly thereof. The secondary inlet 60 faces in full radially outwardly, with the secondary outlet 62 facing in full radially inwardly, and with the secondary vanes 46 being disposed preferably only radially inwardly, without axial inclination, for functioning as radial swirl vanes.

In the preferred embodiment illustrated in FIG. 2, the primary vanes 54 are inclined forwardly from the forward face 44 of the body at an acute inclination angle A preferably less than about 45 degrees. In one embodiment, the inclination angle is preferably about 35 degrees. In this way, the primary vanes 54 retain their configuration as radial swirl vanes, with a small axial inclination for introducing sufficient axial momentum in the primary swirl flow for enhancing performance of the swirler without the need for corresponding axial purge airflow.

The primary inlet 56 preferably faces in major part radially outwardly from the centerline axis of the swirler and in minor part axially forwardly. Correspondingly, the primary outlet 58 faces in major part radially inwardly in the swirler and in minor part axially aft.

As shown in FIGS. 2 and 3, each of the primary vanes 54 includes axially opposite leading and trailing edges 64,66 extending transversely between the two conical side plates of the ferrule. The leading and trailing edges are disposed substantially parallel to each other and axially obliquely or axially inclined in the ferrule. For example, the inclination of the leading and trailing edges of the primary vanes is the complement angle of the inclination angle A, for example the 55 degree complement to the 35 degree inclination angle.

As best illustrated in FIG. 3, each of the primary vanes 54 is preferably substantially straight with circumferentially opposite flat sides extending longitudinally between the leading and trailing edges 64,66 thereof. The primary vanes are suitably inclined circumferentially, at about 36 degrees for example, for swirling the primary air circumferentially inside the venturi 48. In alternate embodiments, the primary swirl vanes could be arcuate or cambered for increasing efficiency, although this increases the complexity of the design.

Correspondingly, the secondary swirl vanes 46 are also preferably straight with flat sides in the preferred embodiment, although they could be arcuate or curved in accordance with conventional practice. Straight vanes for the primary and secondary swirl vanes decreases the complexity of manufacture and cost, while still providing acceptable aerodynamic performance of the swirler for its intended use in the combustor.

As indicated above, the tubular venturi 48 may have a conventional design but extends in a new cooperation from between the junction of the primary and secondary swirl vanes at the forward face 44 of the tubular body and downstream through the tubular body for radially separating the air swirled from the primary and secondary vanes. The inner flow surface of the venturi 48 converges to a throat of minimum flow area and then diverges to the outlet end thereof in a conventional manner for discharging the fuel and air mixture from the swirler with a suitable cone angle without flow separation from the inner surface of the venturi or downstream baffle 50.

A significant feature of the hybrid swirler illustrated in FIGS. 1 and 2 is the primarily radial orientation of the primary vanes 54 which may then be operated to advantage with static pressure air supply. More specifically, each of the outer and inner cowls 20,22 has a forward lip 68 disposed axially forwardly from the primary inlets 56 of the row of swirlers. The cowl lips block or hide the axial line-of-sight with the outer and inner portions of the row of primary inlets, and thusly confine the hybrid swirlers within the plenum 24 bounded by the cowls.

In a preferred method of operation, the pressurized air discharged axially downstream from the compressor 26 illustrated in FIG. 1 includes a substantial dynamic pressure component due to the axial velocity thereof, which may be effectively converted to static pressure as its axial velocity is reduced inside the plenum 24 as constrained by the cowls. As the compressed air is channeled between the cowl lips 68 into the plenum its static pressure increases, with the primary swirler inlet 56 then receiving air under static pressure.

In this way, the static pressure of the inlet air enhances uniformity of the inlet air around the perimeter of each swirler primary inlet as well as enhancing uniformity of inlet air from swirler-to-swirler around the perimeter of the combustor dome.

The fuel 34 is then injected from each of the nozzles 32 into the corresponding swirlers and mixed in turn with the swirled air under static pressure received by the swirler through the corresponding primary and secondary swirl vanes 54,46. The primary swirl air under static pressure is first swirled around and mixed with the initially injected fuel from the nozzle, and then in sequence additional air under static pressure is swirled through the secondary vanes 46 around the central mixture of fuel and air, with the final swirled mixture thereof being discharged into the combustor for undergoing combustion.

As shown in FIG. 3, the primary and secondary swirl vanes are preferably inclined oppositely from each other for effecting counter-rotation of the primary and secondary swirl air streams around the injected fuel.

Furthermore, the fuel nozzle 32 illustrated in FIG. 2 is characterized by the lack of or reduction in purge air channeled therethrough in conjunction with the injected fuel. Since the primary vanes 54 are effective for introducing a significant component of axial momentum in the primary swirl air, the conventional use of purge air through the nozzle for this purpose may be reduced or eliminated for improving the overall efficiency of the combustor and engine.

The hybrid swirler disclosed above improves the ability to optimize the swirler design by adjusting only two parameters, i.e., the primary and secondary flows through the swirl vanes 54,46, while eliminating the need for purge air as a third variable in the design process. The hybrid swirler enjoys improved aerodynamic performance by reducing or eliminating shear of the conventional purge-air jets, as well as eliminating or reducing deswirling of the primary swirl air from such purge jets.

Furthermore, the design of the primary swirl vanes is relatively simple since the primary vanes are primarily configured as radial vanes with a relatively small inclination angle in the axial direction for introducing a sufficient amount of axial momentum. The axial momentum introduced is directly related to the substantial radial velocity or momentum of the primary air, and the primary vanes exhibit the synergy of generating considerable axial momentum from relatively small axial inclination of the radial vanes.

The hybrid swirler may be manufactured conventionally by casting in a correspondingly simplified process of casting the primary and secondary vanes in their respective castings, with the advantages of correspondingly lower cost and the potential for weight reduction.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

What is claimed is:

1. A gas turbine engine swirler comprising:
   a tubular body having a forward face and an aft end, and including a row of secondary swirl vanes extending radially inwardly for swirling air therefrom;
   a tubular ferrule adjoining said body at said forward face thereof, and including a row of primary swirl vanes disposed axially obliquely to said secondary swirl vanes;
   said primary vanes having a common annular primary inlet facing radially outwardly for swirling air radially inwardly with axial momentum into said body; and
   said body further including a tubular venturi extending aft from between said primary and secondary vanes for radially separating air swirled therefrom.

2. A swirler according to claim 1 wherein:
   said secondary vanes have a common annular secondary inlet facing radially outwardly, and a common annular outlet facing radially inwardly around said venturi; and
   said primary vanes further include a common annular primary outlet disposed aft of said primary inlet, and facing radially inwardly toward said venturi for swirling air therethrough.

3. A swirler according to claim 2 wherein:
   said primary inlet faces in part radially outward and in part axially forward, and said primary outlet faces in part radially inward and in part axially aft; and
   said primary vanes each have axially opposite leading and trailing edges disposed substantially parallel to each other and axially obliquely in said ferrule.

4. A swirler according to claim 3 wherein said primary vanes are substantially straight between said leading and trailing edges thereof, and are inclined circumferentially for swirling said air circumferentially inside said venturi.

5. A swirler according to claim 4 wherein said primary vanes are inclined from said body forward face less than about 45 degrees.

6. A swirler according to claim 4 in combination with:
   a combustor dome fixedly joined to said aft end of said body; and
   radially outer and inner cowls extending forwardly from said dome to define a plenum for said air, and having forward lips disposed axially forward of said primary inlet, with said primary inlet facing radially outwardly and inwardly toward said outer and inner cowls, respectively.

7. An apparatus according to claim 6 further comprising a fuel injector nozzle disposed in said ferrule for discharging fuel at said primary outlet.

8. A method of using said apparatus according to claim 7 comprising:
   channeling compressed air between said cowl lips into said plenum for increasing static pressure thereof;
   injecting fuel from said nozzle into said swirler; and
   discharging said compressed air under static pressure through said primary and secondary inlets of said swirler for sequentially swirling with said injected fuel inside said swirler.

9. A gas turbine engine swirler comprising:
   a unitary cast ferrule slidingly joined to a unitary cast body;
   said ferrule including a bore for receiving a fuel injector nozzle, and a row of primary swirl vanes disposed axially obliquely with a centerline axis through said bore, and said primary vanes have a common annular primary inlet facing radially outwardly for swirling air radially inwardly with axial momentum; and
   said body includes a tubular venturi coaxial therein, and a row of secondary swirl vanes for swirling air radially inwardly therefrom around said venturi.

10. A swirler according to claim 9 wherein:
    said primary inlet faces in part radially outwardly and in part axially forwardly;
    said primary vanes further include a cannon annular primary outlet facing in part radially inwardly and in part axially aft; and
    each of said primary vanes includes axially opposite leading and trailing edges disposed substantially parallel to each other and axially obliquely in said ferrule.

11. A gas turbine engine swirler comprising:
    a tubular body having a row of secondary swirl vanes extending radially inwardly for swirling air therefrom; and
    a tubular ferrule adjoining said body at said secondary vanes, and including a row of primary swirl vanes disposed axially obliquely to said secondary vanes, with a cannon annular primary inlet facing radially outwardly for swirling air radially inwardly therefrom with axial momentum into said body.

12. A swirler according to claim 11 wherein:
    said secondary vanes have a common annular secondary inlet facing radially outwardly, and a common annular secondary outlet facing radially inwardly; and
    said primary vanes further include a common annular primary outlet facing radially inwardly, and dispose aft of said primary inlet.

13. A swirler according to claim 12 wherein said primary inlet faces in part radially outwardly and in part axially forwardly, and said primary outlet faces in part radially inwardly and in part axially aft.

14. A swirler according to claim 13 wherein said primary vanes each have axially opposite leading and trailing edges disposed substantially parallel to each other and axially obliquely in said ferrule.

15. A swirler according to claim 14 wherein said primary vanes are substantially straight between said leading and trailing edges thereof, and inclined circumferentially for swirling said air circumferentially inside said body.

16. A swirler according to claim 15 wherein said body further includes a tubular venturi extending aft from between said primary and secondary vanes for radially separating air swirled from said primary and secondary vanes.

17. A swirler according to claim 16 further comprising:
    a combustor fixedly joined to an aft end of said body; and
    radially outer and inner cowls extending forwardly from said dome to define a plenum for containing said air, and having forward lips disposed axially forward of said primary inlet, with said primary inlet facing radially outwardly and inwardly toward said outer and inner cowls, respectively.

18. A gas turbine engine combustor comprising:
    radially outer and inner combustor liners fixedly joined at forward ends thereof to an annular combustor dome;
    radially outer and inner cowls extending forwardly from said dome at said outer and inner liners to define an annular plenum; and
    a plurality of swirlers disposed in a row axially through said dome; and each of said swirlers including:

a tubular body having an aft end joined to said dome, and row of secondary swirl vanes extending radially inwardly for swirling air therefrom; and a tubular ferrule slidingly joined to a forward face of said body, and including a central bore receiving a fuel injector nozzle, and row of primary swirl vanes disposed axially obliquely to said secondary vanes, with a common annular primary inlet facing radially outwardly for swirling air radially inwardly therefrom with axial momentum into said body.

19. A combustor according to claim 18 wherein:

said secondary vanes have a common annular secondary inlet facing radially outwardly, and a common annular secondary outlet facing radially inwardly; and said primary vanes further include a common annular primary outlet facing in part radially inwardly and in part axially aft, and said primary inlet faces in part radially outwardly and in part axially forwardly.

20. A combustor according to claim 19 wherein said primary vanes each have axially opposite leading and trailing edges disposed substantially parallel to each other and axially obliquely in said ferrule, and said primary vanes are substantially straight between said leading and trailing edges, and inclined circumferentially for swirling said air circumferentially inside said body.

* * * * *

UNITED STATES PATENT AND TRADEMARK OFFICE
CERTIFICATE OF CORRECTION

PATENT NO. : 6,834,505 B2
DATED : December 28, 2004
INVENTOR(S) : Marwan Al-Roub et al.

It is certified that error appears in the above-identified patent and that said Letters Patent is hereby corrected as shown below:

Column 8,
Lines 11 and 24, delete "cannon" and substitute -- common --.
Line 32, delete "dispose" and substitute -- disposed --.

Signed and Sealed this

Twenty-second Day of February, 2005

JON W. DUDAS
*Director of the United States Patent and Trademark Office*